US011430238B1

(12) United States Patent
Blechschmidt et al.

(10) Patent No.: US 11,430,238 B1
(45) Date of Patent: Aug. 30, 2022

(54) GENERATING A CONTEXTUAL INFORMATION VECTOR FOR IMPROVED SCENE UNDERSTANDING

(71) Applicant: Apple Inc., Cupertino, CA (US)

(72) Inventors: Angela Blechschmidt, San Jose, CA (US); Mohammad Haris Baig, San Jose, CA (US); Daniel Ulbricht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 273 days.

(21) Appl. No.: 16/838,934

(22) Filed: Apr. 2, 2020

Related U.S. Application Data

(60) Provisional application No. 62/866,795, filed on Jun. 26, 2019.

(51) Int. Cl.
| | |
|---|---|
| *G06V 30/262* | (2022.01) |
| *G06K 9/62* | (2022.01) |
| *G06V 10/40* | (2022.01) |
| *G06N 3/04* | (2006.01) |
| *G06T 7/60* | (2017.01) |
| *G06N 3/08* | (2006.01) |

(52) U.S. Cl.
CPC ......... *G06V 30/274* (2022.01); *G06K 9/6217* (2013.01); *G06N 3/04* (2013.01); *G06N 3/08* (2013.01); *G06T 7/60* (2013.01); *G06V 10/40* (2022.01)

(58) Field of Classification Search
None
See application file for complete search history.

(56) References Cited

U.S. PATENT DOCUMENTS

| | | | |
|---|---|---|---|
| 11,256,960 B2* | 2/2022 | Lee | G06N 3/08 |
| 2019/0124020 A1* | 4/2019 | Bobbarjung | G06F 16/958 |
| 2020/0082219 A1* | 3/2020 | Li | G06N 3/0454 |
| 2020/0302686 A1* | 9/2020 | Totty | G06T 7/50 |
| 2021/0158043 A1* | 5/2021 | Hou | G06V 20/58 |

\* cited by examiner

*Primary Examiner* — Tahmina N Ansari
(74) *Attorney, Agent, or Firm* — Fernando & Partners, LLP

(57) ABSTRACT

In one implementation, a method of generating a confidence value for a result from a primary task is performed at an image processing system. The method includes obtaining, by a feature extractor portion of the neural network, a set of feature maps for an image data frame; generating a contextual information vector associated with the image data frame based on results from one or more auxiliary tasks performed on the set of feature maps by an auxiliary task sub-network portion of the neural network; performing, by a primary task sub-network portion of the neural network, a primary task on the set of feature maps for the image data frame in order to generate a primary task result; and generating a confidence value based on the contextual information vector, wherein the confidence value corresponds to a reliability metric for the primary task result.

23 Claims, 8 Drawing Sheets

GENERATING A CONTEXTUAL INFORMATION VECTOR FOR IMPROVED SCENE UNDERSTANDING

CROSS-REFERENCE TO RELATED APPLICATIONS

This application claims the benefit of U.S. Provisional Patent App. No. 62/866,795, filed on Jun. 26, 2019, which is incorporated by reference in its entirety.

TECHNICAL FIELD

The present disclosure generally relates to an image processing system and, in particular, to an image processing system that performs a number of auxiliary tasks in support of a primary task and/or to determine the reliability of a result of the primary task.

BACKGROUND

In some instances, a semantic segmentation system generates (e.g., characterizes or classifies) labels for pixels of an input image. However, the semantic segmentation system cannot accurately generate the labels when the input image has low contextual information. In turn, inaccurate labels cause further down-stream errors with subsequent operations that make use of the labels from the semantic segmentation system.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
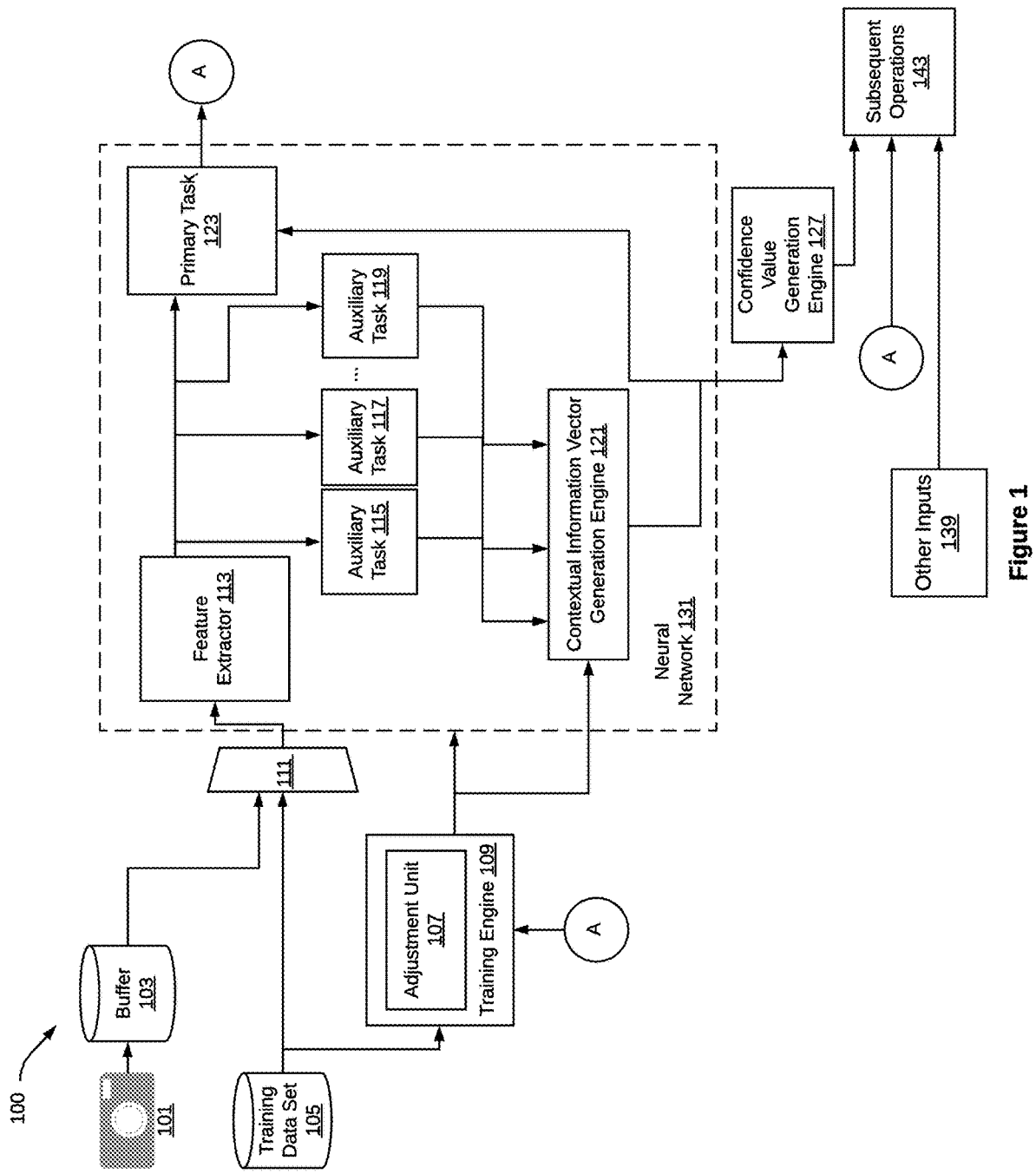
FIG. 1 is a block diagram of an example image processing system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for training an image processing system in order to extract more contextual information from input images. According to some implementations, the method is performed (e.g., during training) at a device with one or more processors, a non-transitory memory, and an image processing system including a training engine, and a neural network having at least a feature extractor, an auxiliary task sub-network, a primary task sub-network, and a contextual information vector generation engine. The method includes: generating, by the feature extractor of the neural network, a set of feature maps for an image data frame in a training data set; generating, by the contextual information vector generation engine, a contextual information vector associated with the image data frame based on results from one or more auxiliary tasks performed on the set of feature maps by the auxiliary task sub-network of the neural network; performing, by the primary task sub-network of the neural network, a primary task based on the set of feature maps and the contextual information vector in order to generate a candidate result for the image data frame; determining, by the training engine, whether a difference between the candidate result for the image data frame and a predetermined result for the image data frame breaches a first threshold; adjusting, by the training engine, operating parameters of the neural network in response to determining that the difference between the candidate result for the image data frame and the predetermined result for the image data frame breaches the first threshold; determining, by the training engine, whether a difference between the contextual information vector and a predetermined contextual information for the image data frame breaches a second threshold; and adjusting, by the training engine, parameters of the contextual information vector generation engine in response to determining that the difference between the contextual information vector and the predetermined contextual information for the image data frame breaches the second threshold.

Various implementations disclosed herein include devices, systems, and methods for generating a confidence value for a result from a primary task in order to model uncertainty of the result. In various methods, the method is performed (e.g., during run-time) at a device with one or more processors, a non-transitory memory, and an image processing system including a confidence value generation engine, and a neural network having at least a feature extractor, an auxiliary task sub-network, a primary task sub-network, and a contextual information vector generation engine. The method includes obtaining, by the feature extractor of the neural network, a set of feature maps for an image data frame by processing the image data frame with the feature extractor of the neural network; generating, by the contextual information vector generation engine, a contextual information vector associated with the image data frame based on results from one or more auxiliary tasks performed on the set of feature maps by the auxiliary task sub-network of the neural network; performing, by the primary task sub-network of the neural network, a primary task on the set of feature maps for the image data frame in order to generate a primary task result; generating, by the confidence value generation engine, a confidence value based at least in part on the contextual information vector, wherein the confidence value corresponds to a reliability metric for the primary task result.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (μLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some instances, an image processing system generates (e.g., characterizes or classifies) labels for pixels of an input image. However, the image processing system cannot accurately generate the labels when the input image has low contextual information. In turn, inaccurate labels cause further image processing and/or scene understanding errors. In accordance with various implementations, an image processing system includes a tiered neural network architecture, which includes at least three distinguishable portions. A feature extractor generates a set of feature maps from an input image. An auxiliary task sub-network performs a number of auxiliary tasks in support of a primary task such as a segmentation task, a depth estimation task, a normal estimation task, or an object detection task. The auxiliary tasks correspond to easier or simpler tasks than the primary task. A primary task sub-network performs the primary task based on the outputs of the feature extractor and the auxiliary task sub-network. The image processing system computes a confidence value associated with the auxiliary tasks in order to determine the reliability of the output from the primary task. The confidence value associated with the auxiliary tasks determines reliability of the output from the primary task because if the image processing system cannot reliably solve the easier tasks then the image processing system cannot reliably trust the solution for the more difficult task.

FIG. 1 is a block diagram of an example image processing system 100 in accordance with some implementations. In various implementations, the example image processing system 100 or portions thereof are included in a device or system such as a laptop computer, a tablet device, a mobile phone, a smartphone, a wearable computing device, a near-eye system, or the like. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, in some implementations, the example image processing system 100 includes at least an image sensor 101, a buffer 103, a training engine 109, a multiplexer (MUX) 111, a neural network 131, and a contextual information vector generation engine 121.

In some implementations, in a training mode, the example image processing system 100 is configured to perform a number of auxiliary tasks 115, 117, and 119 in support of a primary task 123. In turn, the example image processing system 100 trains the neural network 131 (e.g., a recurrent neural network (RNN), a deep neural network (DNN), a convolutional neural network (CNN), or the like) or portions thereof. The features and components involved in the training mode are discussed in greater detail below with respect to an image processing system 200 shown in FIG. 2.

In some implementations, in a run-time mode, the example image processing system 100 is configured to determine whether a result from the primary task 123 is reliable based on a confidence value (e.g., the confidence value 661 shown in FIG. 6) associated with the auxiliary tasks 115, 117, and 119 in order to model uncertainty of the primary task result. In some implementations, the auxiliary tasks 115, 117, and 119 correspond to easier or simpler tasks than the primary task 123. As such, if the neural network 131 cannot reliably solve the easier tasks (e.g., auxiliary tasks 115, 117, and 119), then the example image processing system 100 cannot reliably trust the solution for the more difficult task (e.g., primary task 123). The features and components involved in the run-time mode are discussed in greater detail below with respect to an image processing system 300 shown in FIG. 3.

In some implementations, the neural network 131 includes: (A) the feature extractor 113 corresponding to a feature extractor portion of the neural network 131 (e.g., the input layer 720, the hidden layer 1 722, and/or the hidden layer N-1 724 shown in FIG. 7); (B) the auxiliary tasks 115, 117, and 119 corresponding to an auxiliary task sub-network portion of the neural network 131 (e.g., a portion of the N-th output layer 726 shown in FIG. 7); (C) the primary task 123 corresponding to a primary task sub-network portion of the neural network 131 (e.g., a portion of the N-th output layer 726 shown in FIG. 7); and (D) a contextual information vector generation engine 121. In some implementations, the neural network 131 corresponds to a single neural network.

Alternatively, each portion of the neural network 131 corresponds to a separate neural network. An example of the neural network 131 according to some implementations is described in further detail in FIG. 7.

In some implementations, the feature extractor 113 (e.g., the feature extractor of the neural network 131) generates a set of feature maps or feature representations for an image data frame. In some implementations, a feature map is an output received by convolving the image data frame with a particular feature. One of ordinary skill in the art would understand that the feature extractor 113 can perform any number of image pre-processing tasks.

In some implementations, the primary task 123 performs a segmentation task, such as instance segmentation, semantic segmentation, or the like, on the results from the feature extractor 113 (e.g., the feature maps 621 shown in FIG. 6) and optionally a contextual information vector from the contextual information vector generation engine 121. In some implementations, instance segmentation corresponds to detecting and delineating distinct objects within an image data frame. In some implementations, semantic segmentation corresponds to detecting and labeling objects that appear within the image data frame. In some implementations, the result of the primary task 123 is a plurality of labeled or unlabeled objects associated with a particular image data frame. In some implementations, the primary task includes one or more scene understanding tasks (e.g., segmentation and surface normal tasks, segmentation and depth estimation tasks, and/or the like)—in which case a first threshold (discussed in detail below) factors into account the error over a plurality of subtasks if multiple subtasks compose the primary task. In some implementations, the primary task described in the specification may correspond to one of a segmentation task, a depth estimation task, a normal estimation task, an object detection task, or the like.

In some implementations, at least one of the auxiliary tasks 115, 117, and 119 perform scene understanding tasks, scene classification tasks, object recognition tasks, or the like based on the results from the feature extractor 113 (e.g., the feature maps). In some implementations, the scene understanding tasks include applying one or more classifiers in order to determine the presence or absence of a specific object or the like. As a non-limiting example, the one or more classifiers may determine whether a table is present or absent within a scene, whether a chair is present or absent within a scene, or the like. In some implementations, the scene classification tasks correspond to classifying a scene (e.g., kitchen scene, bathroom scene, camping scene, or the like) based on a number of recognized objects (e.g., range, microwave, and refrigerator for a kitchen scene, or toilet, towel, and tub for a bathroom scene). In some implementations, at least one of the auxiliary tasks 115, 117, and 119 correspond to segmentation tasks (e.g., instance segmentation, semantic segmentation, or the like). Although the auxiliary tasks 115, 117, and 119 are depicted in FIG. 1, as will be understood by one of ordinary skill in the art, any number of parallel and/or serial auxiliary tasks may be present within the neural network 131.

Figure 6:
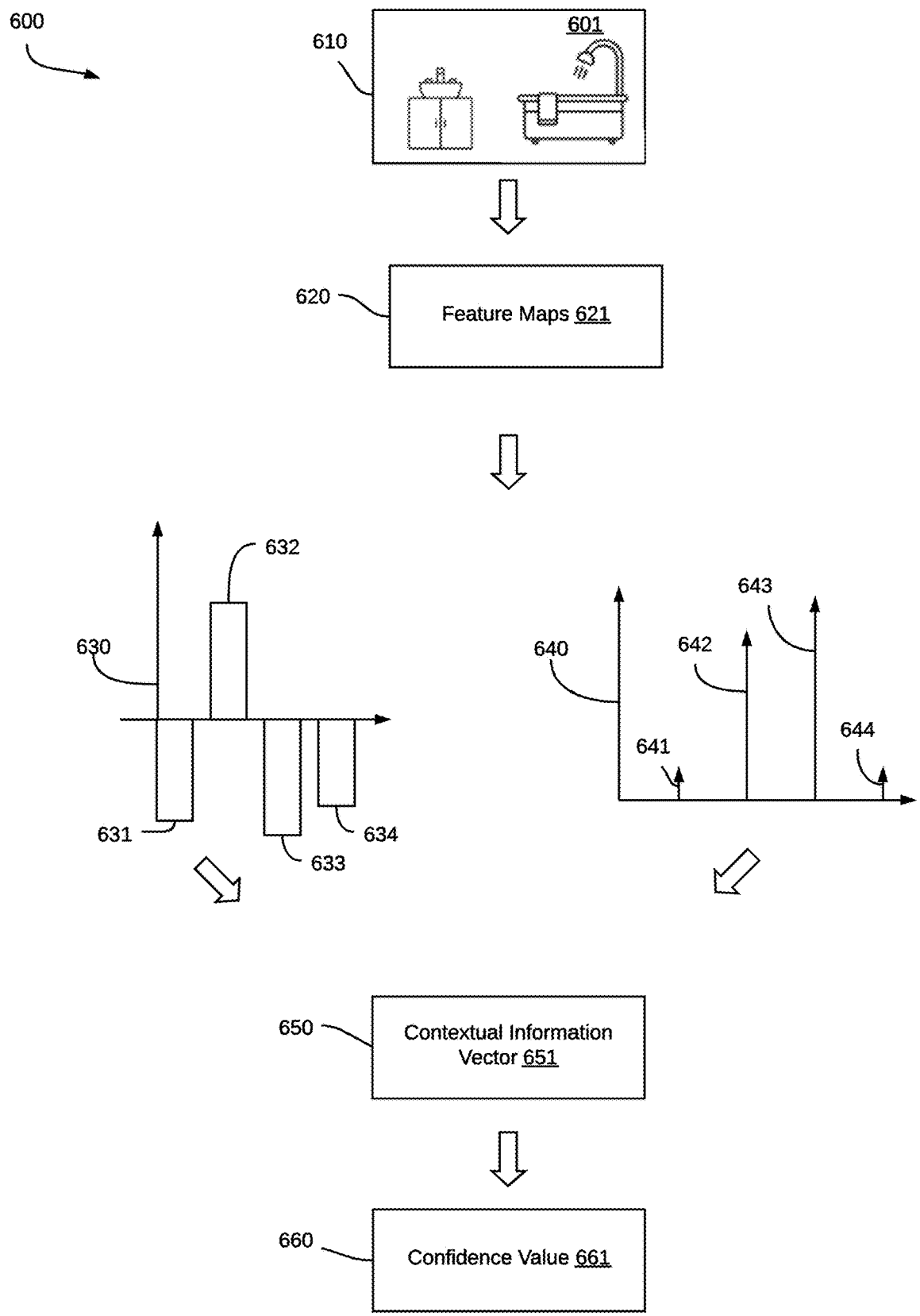
FIG. 6 illustrates a process for generating a confidence value based on results from one or more auxiliary tasks in accordance with some implementations.

In some implementations, the contextual information vector generation engine 121 uses the results of the auxiliary tasks 115, 117, and 119 (e.g., the auxiliary task sub-network of the neural network 131) to generate a contextual information vector (e.g., the contextual information vector 651 shown in FIG. 6). In some implementations, the contextual information vector generation engine 121 generates a contextual information vector or tensor based on the result from each of the auxiliary tasks 115, 117, and 119. In some implementations, the contextual information vector generation engine 121 generates a single contextual information vector (e.g., the contextual information vector 651 shown in FIG. 6) or tensor that is a function of the results of the auxiliary tasks 115, 117, and 119.

In some implementations, the MUX 111 coordinates switching between training and run-time modes. The MUX 111 couples the training data set 105 and the buffer 103 to a feature extractor 113. In some implementations, a system controller or operating system (e.g., the operating system 830 shown in FIG. 8) manages the operation of the MUX 111. In the training mode, the MUX 111 couples the training data set 105 to the feature extractor 113. In the run-time mode, the MUX 111 couples the buffer 103 to the feature extractor 113.

In some implementations, the training engine 109 includes an adjustment unit 107. In some implementations, the training data set 105 is input into the training engine 109 in order to train the neural network 131 or portions thereof. The training data set 105 includes a corpus of image data frames and known values (e.g., labels) for the image data frames.

In some implementations, the adjustment unit 107 adjusts operating parameters of the neural network 131 or portions thereof based at least in part on a determination that a difference between the candidate result for the image data frame (e.g., the primary task result from the primary task 123) and a predetermined result for the image data frame breaches a first threshold. The process of adjusting the neural network 131 or portions thereof is described in greater detail below with reference to the image processing system 200 shown in FIG. 2 and method 400 in FIG. 4. In some implementations, the adjustment unit 107 adjusts parameters of the contextual information vector generation engine 121 based at least in part on a determination that a difference between the contextual information vector and a predetermined contextual information for the image data frame breaches a second threshold. The process of adjusting the contextual information vector generation engine 121 is described in greater detail below with reference to method 400 in FIG. 4.

After the training engine 109 has trained the neural network 131, the neural network 131 may begin to operate in a run-time mode. In the run-time mode, the MUX 111 is used to couple the image sensor 101 and the buffer 103 to the feature extractor 113.

In some implementations, the image sensor 101 is provided to obtain image data frames. In some implementations, the image data frames obtained by the image sensor 101 are stored in the buffer 103 (e.g., a non-transitory memory), which is accessible to the neural network 131 through the MUX 111.

In some implementations, the confidence value generation engine 127 generates a confidence value (e.g., the confidence value 661 shown in FIG. 6) or probability based on the contextual information vector(s) (e.g., the contextual information vector 651 shown in FIG. 6) from the contextual information vector generation engine 121. In some implementations, as mentioned above, the contextual information vector generation engine 121 generates the contextual information vector(s) based on results from the auxiliary tasks 115, 117, and 119 performed on the set of feature maps.

In some implementations, the one or more subsequent operations 143 may include downstream processing such as rendering CGR content or CGR environments based at least in part on the confidence value. For example, if the confidence is low, then the one or more subsequent operations 143 will discard the output from the primary task 123. In some implementations, the one or more subsequent operations 143 will use the output from the primary task 123 but assign the output from the primary task 123 a weight based on the confidence value. In some implementations, the one or more subsequent operations 143 correspond to operations such as plane detection, plane estimation, object tracking, or the like. For example, if the subsequent operations 143 correspond to plane expansion, the plane expansion operation uses the primary task 123 to expand estimated plane(s) when there is sufficient confidence in the primary task result from the primary task 123. However, continuing with the plane expansion example above, if there is not sufficient confidence in the primary task result from the primary task 123, the plane expansion operation will either fall back to using some other form of segmentation, such as geometric plane estimation and expansion, or the like. As another example, continuing with the plane expansion example, if there is not sufficient confidence in the primary task result from the primary task 123, the plane expansion operation will use the output from the primary task 123 but assign the output from the primary task 123 a low weight indicating a lack of reliability. Further details regarding plane expansion based on semantic segmentation is disclosed in U.S. Application Ser. No. 62/689,474 titled "Plane Detection Using Semantic Segmentation," filed on Jun. 25, 2018, which is hereby incorporated by reference in its entirety.

In some implementations, a verification engine is placed after the confidence value generation engine 127. In some implementations, the verification engine determines whether the confidence value from the confidence value generation engine 127 breaches a reliability threshold. If the confidence value breaches the reliability threshold, the result from the primary task 123 is input to the subsequent operations 143. If the confidence value does not breach the reliability threshold, the other inputs 139 are input to the subsequent operations 143. In other words, the verification engine determines whether a result from the primary task 123 can be reliably used for the subsequent operations 143.

Although the training engine 109, the neural network 131, the contextual information vector generation engine 121, and the confidence value generation engine 127 are shown as residing on a single device (e.g., the image processing system 100), it should be understood that in other implementations, any combination of the training engine 109, the neural network 131, the contextual information vector generation engine 121, and the confidence value generation engine 127 may be located in separate computing devices.

Moreover, FIG. 1 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 1 could be implemented in a single module and the various functions of single functional blocks could be implemented by one or more functional blocks in various implementations. The actual number of modules and the division of particular functions and how features are allocated among them will vary from one embodiment to another and, in some implementations, depends in part on the particular combination of hardware, software, and/or firmware chosen for a particular embodiment.

Figure 2:
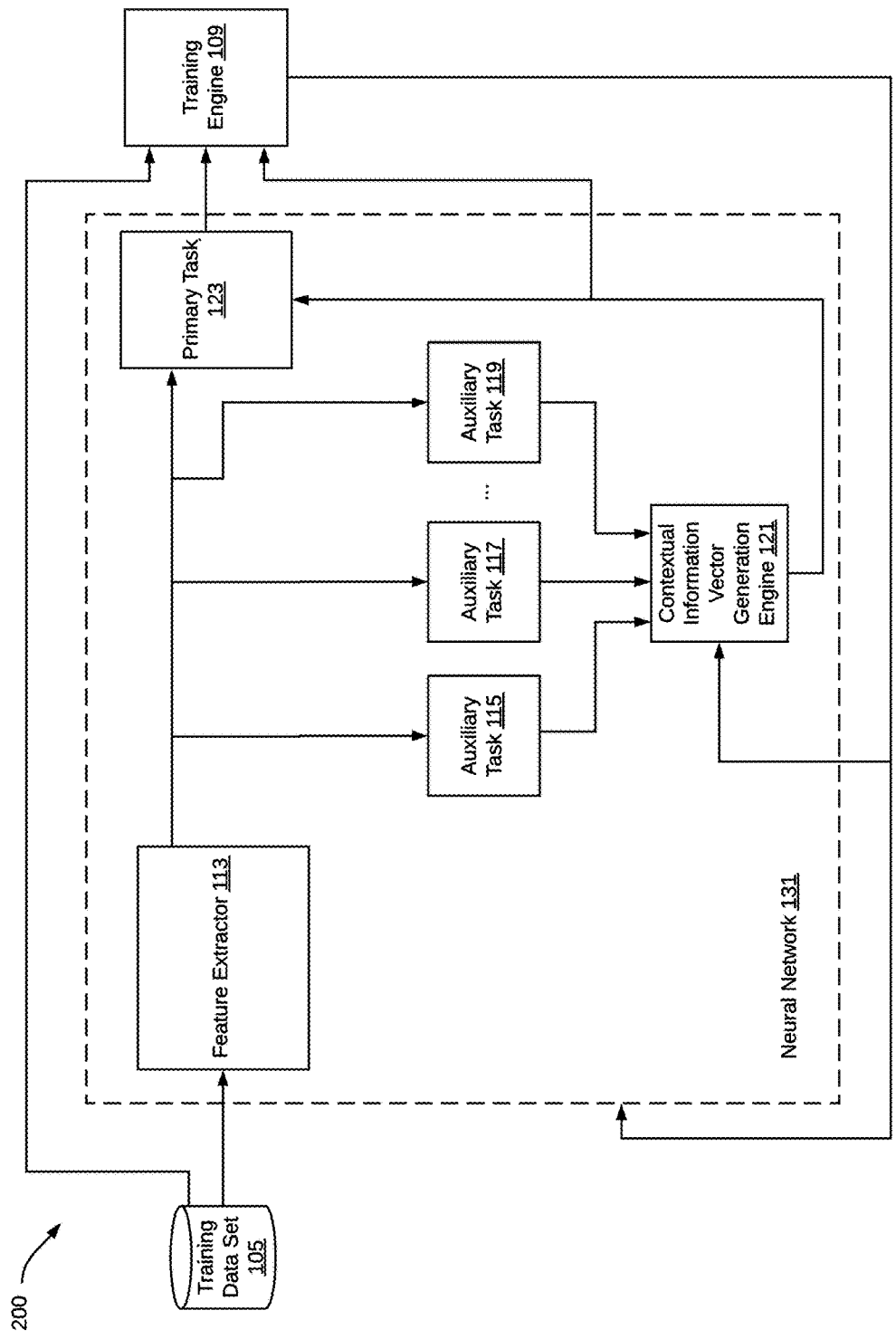
FIG. 2 is a block diagram of a training implementation of an image processing system for scene classification in accordance with some implementations.

FIG. 2 is a block diagram of a training implementation of an image processing system in accordance with some implementations. The image processing system 200 is configured to perform a number of auxiliary tasks 115, 117, and 119 in support of a primary task 123 in order to extract more contextual information from input images. The image processing system 200 illustrated in FIG. 2 is similar to and adapted from the example image processing system 100 illustrated in FIG. 1. Accordingly, elements common to FIG. 1 includes common reference numbers, and only the differences between FIGS. 2 and 1 are described herein for the sake of brevity. Again, while pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 2, the image processing system 200 (e.g., the training implementation of the image processing system 100 shown in FIG. 1) includes: the training data set 105; the neural network 131; and the training engine 109. In some implementations, the neural network 131 includes: (A) the feature extractor 113 corresponding to the feature extractor of the neural network 131; (B) a number of auxiliary tasks 115, 117, and 119 corresponding to the auxiliary task sub-network of the neural network 131; (C) the primary task 123 corresponding to the primary task sub-network of the neural network 131; and (D) the contextual information vector generation engine 121. In some implementations, the accuracy of the primary task 123 is lower without the aid of the auxiliary tasks 115, 117, and 119. As such, the auxiliary tasks 115, 117, and 119 are configured and provided to support the operation of the primary task 123.

In some implementations, the feature extractor 113 (e.g., the first portion of the neural network 131) generates feature maps or the like based on an image data frame provided by the training data set 105. In some implementations, the auxiliary tasks 115, 117, and 119 (e.g., the auxiliary task sub-network of the neural network 131) correspond to scene understanding or classification tasks that are performed by classifiers on the feature maps from the feature extractor 113. In some implementations, the contextual information vector generation engine 121 generates contextual information vector(s) (e.g., the contextual information vector 651 shown in FIG. 6) based on the results of the auxiliary tasks 115, 117, and 119. In some implementations, the primary task 123 (e.g., the primary task sub-network of the neural network 131) corresponds to an instance segmentation task or a semantic segmentation task that is performed on a set of feature maps for the image data frame from the training data set 105 and the contextual information vector(s). In some embodiments, the primary task 123 is performed in order to generate a candidate result for the image data frame from the training data set 105.

In some implementations, the contextual information vector generation engine 121 aggregates or otherwise performs a calculation on the results from the auxiliary tasks 115, 117, and 119. In some implementations, the contextual information vector generation engine 121 generates individual contextual information vectors for each of the auxiliary tasks 115, 117, and 119. In some implementations, the contextual information vector generation engine 121 does not aggregate or perform a calculation on the results from the auxiliary tasks 115, 117, and 119 if the image processing system 200 uses a single auxiliary task (e.g., scene classification).

In some implementations, the training engine 109 determines whether a difference between the candidate result for the image data frame and a predetermined result for the image data frame breaches a first threshold (e.g., at least X labels are incorrect when comparing the labels associated with the candidate result to labels associated with predetermined result) and a difference between contextual information vector and a predetermined contextual information for the image data frame breaches a second threshold. In some implementations, both the first and second threshold correspond to a preset or deterministic error threshold that should be satisfied before training is complete. In some implementations, the training engine 109 or a component thereof (e.g., the adjustment unit 107 shown in FIG. 1) adjusts operating parameters (e.g., neural/filter weights) of one or more portions of the neural network 131 based at least in part on a determination that the difference between the candidate result for the image data frame and a predetermined result for the image data frame breaches the first threshold. In some implementations, the training engine 109 or a component thereof adjusts parameters of the contextual information vector generation engine based at least in part on a determination that the difference between the contextual information vector and a predetermined contextual information for the image data frame breaches the second threshold. The process of training the image processing system 200 is described in greater detail below with reference to the method 400 in FIG. 4.

Figure 3:
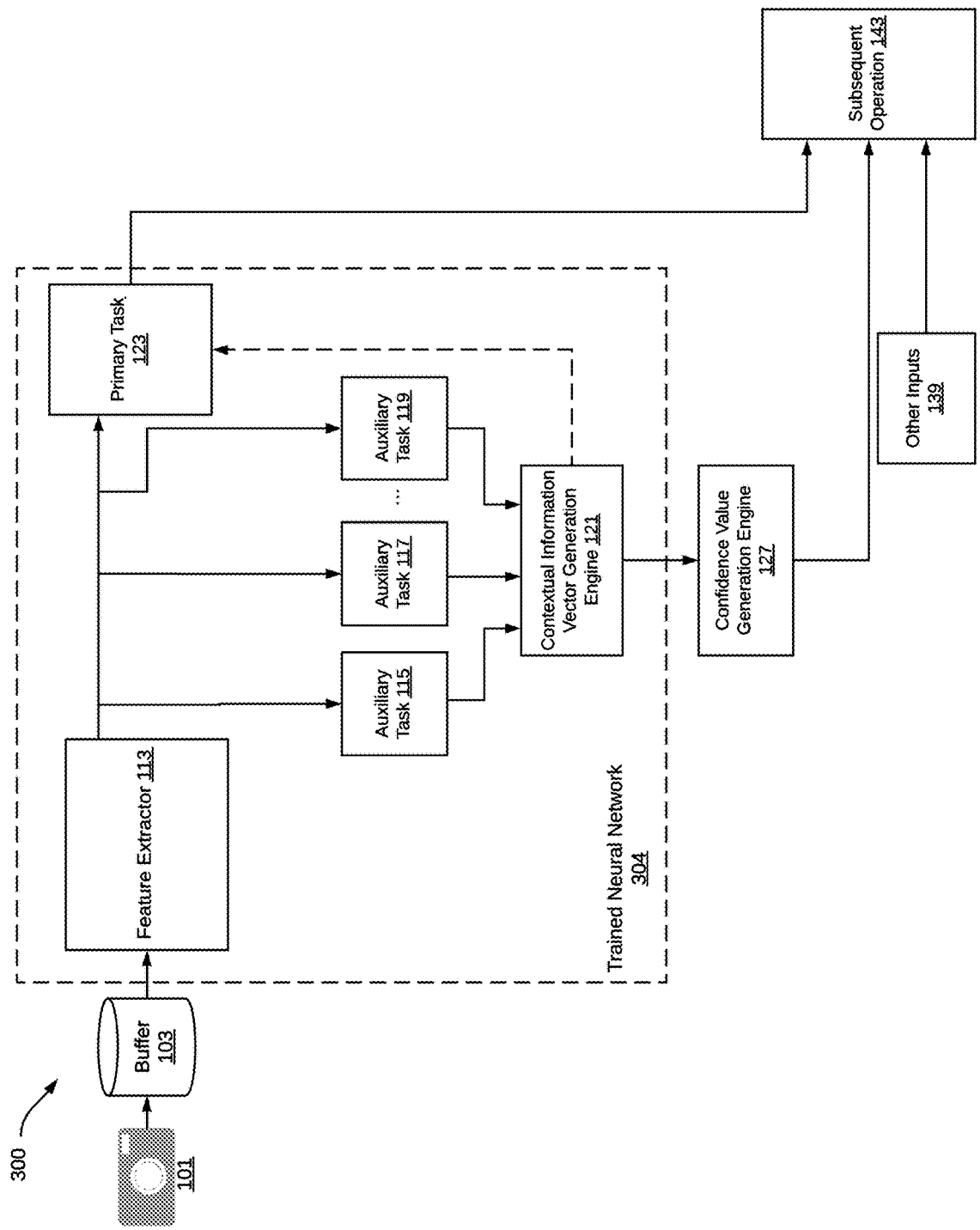
FIG. 3 is a block diagram of a run-time implementation of an image processing system in accordance with some implementations.

FIG. 3 is a block diagram of a run-time implementation of an image processing system 300 in accordance with some implementations. The image processing system 300 illustrated in FIG. 3 is similar to and adapted from the example image processing system 100 illustrated in FIG. 1. Accordingly, elements common to FIG. 1 includes common reference numbers, and only the differences between FIGS. 3 and 1 are described herein for the sake of brevity. Again, while pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, as shown in FIG. 3, the image processing system 300 (e.g., the run-time implementation of the image processing system 100 shown in FIG. 1) includes: the image sensor 101; the buffer 103; a trained neural network 304; and the confidence value generation engine 127.

In some implementations, the image sensor 101 is provided to obtain an image data frame that can be stored in a non-transitory memory. The image data frame is stored in the buffer 103, which is accessible to the trained neural network 304.

In some implementations, the contextual information vector generation engine 121 generates contextual information vector(s) (e.g., the contextual information vector 651 shown in FIG. 6) based on the results of the auxiliary tasks 115, 117, and 119. In some implementations, the contextual information vector generation engine 121 optionally inputs the contextual information vector(s) back to the primary task 123.

The process of generating the contextual information vector is described in detail in FIG. 6. In some implementations, the contextual information vector generation engine 121 aggregates or otherwise performs a calculation on the results from the auxiliary tasks 115, 117, and 119. In some implementations, the contextual information vector generation engine 121 generates individual contextual information vectors for each of the auxiliary tasks 115, 117, and 119. In some implementations, the contextual information vector generation engine 121 does not aggregate or perform a calculation on the results from the auxiliary tasks 115, 117, and 119 if the image processing system 300 uses a single auxiliary task (e.g., scene classification).

In some implementations, the confidence value generation engine 127 is configured to generate the confidence value (e.g., the confidence value 661 shown in FIG. 6) or a probability based on a function of the contextual information vector(s). In some implementations, the confidence value or probability is associated with an uncertainty of the result of the primary task 123. For example, if the results of the auxiliary tasks 115, 117, and 119 do not reliably indicate what type of scene (e.g., living room, kitchen, bathroom) is present within the image data frame, then the result of the primary task 123 may be unreliable.

In some implementations, a verification engine is placed after the confidence value generation engine 127. In some implementations, the verification engine determines whether the confidence value from the confidence value generation engine 127 breaches a reliability threshold. If the confidence value breaches the reliability threshold, the result from the primary task 123 is input to the subsequent operations 143. If the confidence value does not breach the reliability threshold, the other inputs 139 are input to the subsequent operations 143. In other words, the verification engine determines whether a result from the primary task 123 can be reliably used for the subsequent operations 143.

Figure 4:
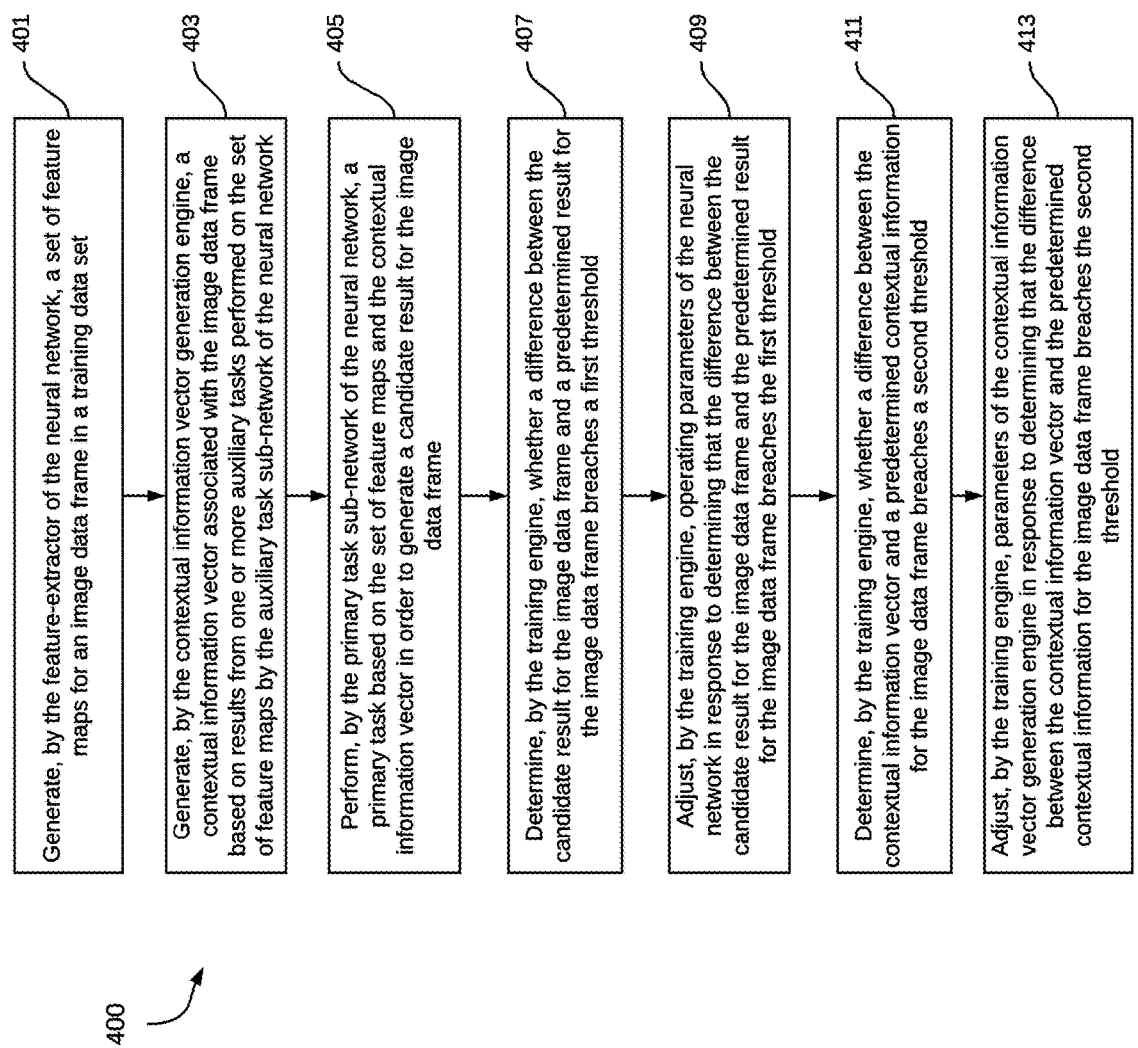
FIG. 4 is a flowchart representation of a method of training an image processing system in accordance with some implementations.

FIG. 4 is a flowchart representation of a method 400 of training an image processing system in accordance with some implementations. In various implementations, the method 400 is performed at an image processing system (e.g., the image processing system 200 shown in FIG. 2) including a training engine (e.g., the training engine 109 shown in FIGS. 1 and 2), and a neural network (e.g., the neural network 131 shown in FIGS. 1 and 2) having at least a feature extractor, an auxiliary task sub-network, a primary task sub-network, and a contextual information vector generation engine (e.g., the contextual information vector generation engine 121 shown in FIGS. 1-3). In various implementations, the method 400 is performed by a device (e.g., the device 801 shown in FIG. 8) with one or more processors and a non-transitory memory that trains the image processing system 200 shown in FIG. 2. In some implementations, the method 400 is performed by processing logic, including hardware, firmware, software, or a combination thereof. In some implementations, the method 400 is performed by a processor executing code stored in a non-transitory computer-readable medium (e.g., a memory).

As represented by block 401, the method 400 includes generating, by the feature extractor of a neural network (e.g., the feature extractor 113 of the neural network 131 shown in FIGS. 1 and 2), a set of feature maps (e.g., the feature maps 621 shown in FIG. 6) for an image data frame in a training data set (e.g., the training data set 105 shown in FIGS. 1 and 2). In some implementations, the feature extractor of the neural network (e.g., the neural network 131 shown in FIGS. 1 and 2) corresponds to hidden layers of the neural network (e.g., the hidden layer 1 722 and the hidden layer N-1 724 shown in FIG. 7). In some implementations, the image data frame corresponds to a set of one or more image data frames. In some implementations, the image data frame is replaced by a plurality of image data frames.

As represented by block 403, the method 400 includes generating, by a contextual information vector generation engine (e.g., the contextual information vector generation engine 121 shown in FIGS. 1-3), a contextual information vector (e.g., the contextual information vector 651 shown in FIG. 6) associated with the image data frame based on results from one or more auxiliary tasks (e.g., the auxiliary tasks 115, 117, and 119 shown in FIGS. 1-3) performed on the set of feature maps by the auxiliary task sub-network of the neural network. In some implementations, the method 400 includes generating a contextual information vector associated with a plurality of image data frames based on results from one or more auxiliary tasks (instead of a single image data frame). In some implementations, the contextual information vector is obtained by evaluating the performance of the primary task. In some implementations, the contextual information vector is obtained by evaluating the performance of the primary task relative to a different model (e.g., not the one being trained). In some implementations, the contextual information vector is obtained by evaluating the performance of the primary task relative to an ensemble of models (e.g., including or not including the one being trained). In some implementations, the auxiliary task sub-network of the neural network corresponds to one or more parallel output layers of the neural network that perform auxiliary tasks. In some implementations, the auxiliary tasks correspond to scene understanding tasks such as an absence or presence of a specific object, object recognition, scene classification, or the like. In some implementations, the contextual information vector generation engine generates contextual information vectors or tensors for each auxiliary task. In some implementations, the contextual information vector generation engine generates a single contextual information vector or tensor that is a function of the outputs of the auxiliary tasks.

As represented by block 405, the method 400 includes performing, by the primary task sub-network of the neural network, a primary task (e.g., the primary task 123 shown in FIGS. 1-3) based on the set of feature maps and the contextual information vector in order to generate a candidate result for the image data frame. In some implementations, the primary task sub-network of the neural network corresponds to an output layer of the neural network (e.g., the primary layer 730 shown in FIG. 7) that performs the primary task. In some implementations, the candidate result is the result of instance segmentation or semantic segmentation. In some implementations, instance segmentation corresponds to detecting and delineating distinct objects that appear within an image data frame. In some implementations, semantic segmentation corresponds to detecting and labeling objects that appear within the image data frame. In some implementations, the primary task described in FIG. 4 corresponds to one of a depth estimation task, a normal estimation task, an object detection task, or the like.

As represented by block 407, the method 400 includes determining, by a training engine (e.g., the training engine 109 shown in FIGS. 1 and 2), whether a difference between the candidate result for the image data frame and a predetermined result for the image data frame breaches a first threshold. In some implementations, the predetermined result is part of the training data set (e.g., the training data set 105 shown in FIGS. 1 and 2). In some implementations, the first threshold corresponds to a preset or deterministic error threshold that should be satisfied before training is complete. For example, the difference corresponds to a number of incorrect labels when the candidate result is compared to the predetermined result (e.g., when the primary task corresponds to semantic segmentation). Continuing with this example, the first threshold is breached when the number of incorrect labels is greater than a predefined value. As another example, the difference corresponds to a delta between the number of object instances when the candidate result is compared to the predetermined result (e.g., when the primary task corresponds to instance segmentation). Continuing with this example, the first threshold is breached when the delta of object instances is greater than a predefined value.

As represented by block 409, the method 400 includes adjusting, by the training engine (e.g., the training engine 109 shown in FIGS. 1 and 2), operating parameters of the neural network in response to determining that the difference between the candidate result for the image data frame and the predetermined result for the image data frame breaches the first threshold. In some implementations, adjusting the operating parameters of the neural network further includes modifying the operating parameters of at least one of the feature extractor, the auxiliary task sub-network, or the primary task sub-network portions of the neural network in order to reduce the error threshold for at least one image data frame. In some implementations, adjusting the operating parameters of the neural network further includes modifying the operating parameters of at least one of the feature extractor, the auxiliary task sub-network, or the primary task sub-network portions of the neural network in order to reduce the error across multiple sets of image data frames.

As represented by block 411, the method 400 includes determining, by the training engine, whether a difference between the contextual information vector and the predetermined contextual information for the image data frame breaches a second threshold. In some implementations, the predetermined contextual information is part of the training data set (e.g., the training data set 105 shown in FIGS. 1 and 2). In some implementations, the second threshold corresponds to a preset or deterministic error threshold that should be satisfied before training is complete.

As represented by block 413, the method 400 includes adjusting, by the training engine, parameters of the contextual information vector generation engine 121 in response to determining that the difference between the contextual information vector and the predetermined contextual information for the image data frame breaches the second threshold. In some implementations, adjusting the parameters of the contextual information vector generation engine 121 includes weighing the individual results from the auxiliary tasks differently before inputting the individual results from the auxiliary tasks into the contextual information vector generation engine 121. In some implementations, adjusting the parameters of the contextual information vector generation engine 121 includes adjusting the parameters such that the parameters affect the way the contextual information vector generation engine 121 generates contextual information vectors based on the results from the auxiliary tasks.

In some implementations, the method 400 includes determining that the neural network has been trained in response to determining that the difference between the candidate result for the image data frame and the predetermined result for the image data frame does not breach the first threshold and the difference between the contextual information vector and the predetermined contextual information for the image data frame does note breach the second threshold. In some implementations, the image processing system will continue training the training process if either the first threshold or the second threshold is not satisfied.

In some implementations, the method 400 includes obtaining the training data set, wherein the training data set includes the image data frame. In some implementations, the training data set includes a plurality of image data frames and known values for the image data frame (e.g., predetermined segmentation results).

Figure 5:
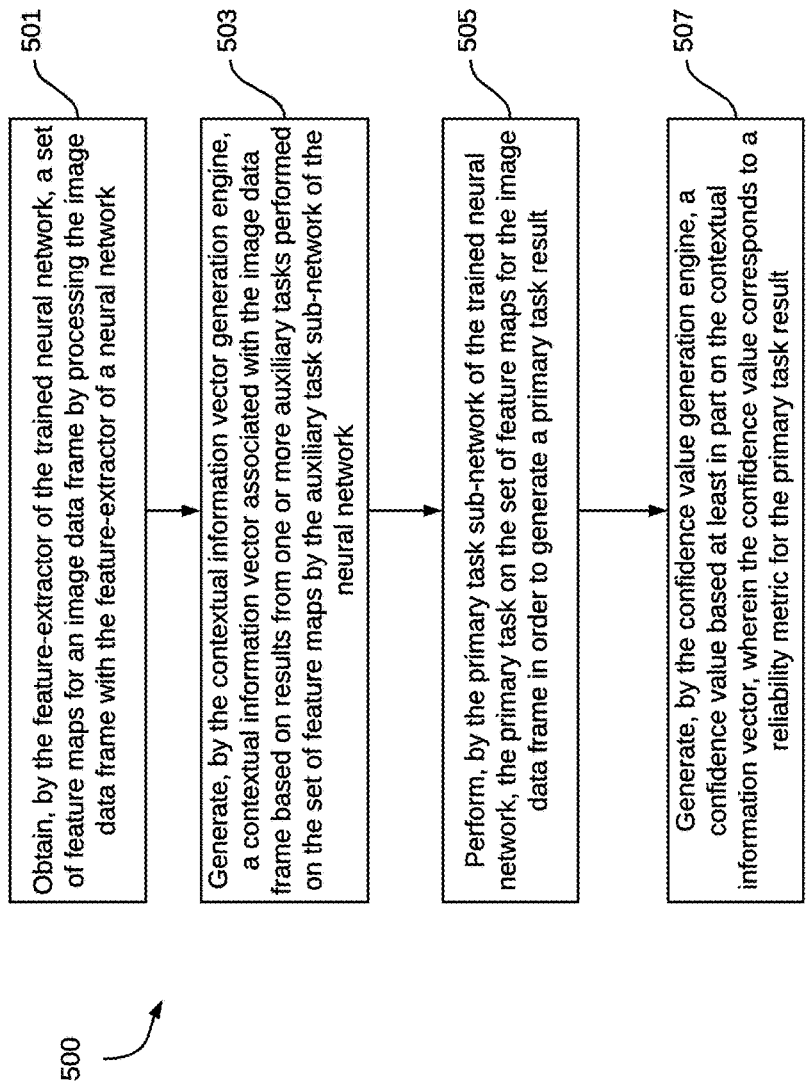
FIG. 5 is a flowchart representation of a method of generating a confidence value for a primary task result from a primary task in accordance with some implementations.

FIG. 5 is a flowchart representation of a method 500 of generating a confidence value for a primary task result from a primary task in accordance with some implementations. In various implementations, the method 500 is performed at an image processing system (e.g., the image processing system 300 shown in FIG. 3) including a contextual information vector generation engine (e.g., the contextual information vector generation engine 121 shown in FIGS. 1-3), and a neural network (e.g., the trained neural network 304 shown in FIG. 3) having at least a feature extractor, an auxiliary task sub-network, a primary task sub-network, and a confidence value generation engine (e.g., the confidence value generation engine 127 shown in FIGS. 1 and 3). In various implementations, the method 500 is performed by a device (e.g., the device 801 shown in FIG. 8) with one or more processors and non-transitory memory. In some implementations, the method 500 is performed by processing logic, including hardware, firmware, software, or a combination thereof. In some implementations, the method 500 is performed by a processor executing code stored in a non-transitory computer-readable medium (e.g., a memory).

As represented by block 501, the method 500 includes obtaining, by the feature extractor (e.g., the feature extractor 113 shown in FIGS. 1 and 3) of a neural network (e.g., the trained neural network 304 shown in FIG. 3), a set of feature maps (e.g., the feature maps 621 shown in FIG. 6) for an image data frame by processing the image data frame with the feature extractor of the neural network. In some implementations, the set of feature maps correspond to feature representations. In some implementations, the image data frame corresponds to a set of one or more image data frames. In some implementations, the image data frame is replaced by a plurality of image data frames.

As represented by block 503, the method 500 includes generating, by a contextual information vector generation engine (e.g., the contextual information vector generation engine 121 shown in FIGS. 1-3), a contextual information vector (e.g., the contextual information vector 651 shown in FIG. 6) associated with the image data frame based on results from auxiliary tasks (e.g., the auxiliary tasks 115, 117, and 119 shown in FIGS. 1-3 and 7) performed on the set of feature maps by the auxiliary task sub-network of the neural network (e.g., the trained neural network 304 shown in FIG. 3). In some implementations, the contextual information vector generation engine provides individual results (e.g., the plurality of prediction values 631, 632, 633, and 634 shown in FIG. 6 or the plurality of contextual information values 641, 642, 643, and 644 shown in FIG. 6) from the auxiliary tasks. In some implementations, the contextual information vector generation engine aggregates the results from the auxiliary tasks.

As represented by block 505, the method 500 includes performing, by the primary task sub-network of the neural network (e.g., the trained neural network 304 shown in FIG. 3), a primary task (e.g., the primary task 123 shown in FIGS. 1-3) on the set of feature maps for the image data frame in order to generate a primary task result. In some implementations, the primary task described in FIG. 5 may correspond to one of a segmentation task, a depth estimation task, a normal estimation task, an object detection task, or the like.

As represented by block 507, the method 500 includes generating, by the confidence value generation engine, a confidence value based at least in part on the contextual information vector (e.g., the contextual information vector 651 shown in FIG. 6), wherein the confidence value corresponds to a reliability metric for the primary task result. In some implementations, the confidence value may correspond to a probability or a score. In some implementations, the confidence value is associated with uncertainty of the primary task result from the primary task. As such, the confidence value corresponds to a reliability metric for the primary task result.

In some implementations, the method 500 further includes determining whether or not the confidence value breaches a reliability threshold. In some implementations, the method 500 further includes providing the primary task result from the primary task to one or more subsequent operations (e.g., the one or more subsequent operations 143 shown in FIGS. 1 and 3) in response to determining that the confidence value breaches the reliability threshold. In some implementations, the one or more subsequent operations correspond to plane detection, plane estimation, or other operations that use the segmentation output.

In some implementations, the method 500 further includes generating an error alert associated with the primary task result in response to determining that the confidence value does not breach the reliability threshold. In some implementations, the error alert informs a user to re-take or re-capture an image data frame by zooming out in order to obtain a better view of the scene.

In some implementations, the method 500 further includes discarding the primary task result in response to determining that the confidence value does not breach the reliability threshold. In some implementations, the image processing system discards the image data frame because subsequent operations cannot trust results from the trained neural network. As such, the image processing system must fall back to using some other form of segmentation other than the primary task result or the like. For example, an image processing system may perform plane expansion based on the primary task result if the confidence value breaches a reliability threshold. However, if the confidence value does not breach the reliability threshold, then the image processing system will discard the results of the primary task and perform a geometric plane estimation and/or expansion on the image data frame.

In some implementations, the method 500 further includes providing the contextual information vector to the primary task sub-network of the trained neural network (e.g., the primary task 123 shown in FIGS. 1 and 3) and performing, by the primary task sub-network of the trained neural network, the primary task based on the set of feature maps and the contextual information vector. Inputting contextual information back into the trained neural network will improve the overall neural network. For example, if the scene is predicted to be a kitchen with high confidence, then the image processing system is more likely to identify objects associated with a kitchen such as an oven or refrigerator.

In some implementations, the method 500 further includes obtaining the image data frame, wherein the image data frame includes a plurality of pixels. In some implementations, obtaining the image data frames includes capturing image data frames using an image sensor of a device such as a forward-facing camera (e.g., the image sensor 101 shown in FIGS. 1 and 3), tablet, remote camera, or database.

FIG. 6 illustrates a process 600 for generating a confidence value in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, an image processing system (e.g., the image processing system 300 shown in FIG. 3) performs the process 600, wherein the image processing system includes a trained neural network (e.g., the trained neural network 304 shown in FIG. 3). In some implementations, the trained neural network includes: a feature extractor (e.g., the feature extractor 113 shown in FIGS. 1-3), a primary task (e.g., the primary task 123 shown in FIGS. 1-3), and one or more auxiliary tasks (e.g., the auxiliary tasks 115, 117 and 119 shown in FIGS. 1-3).

Figure 8:
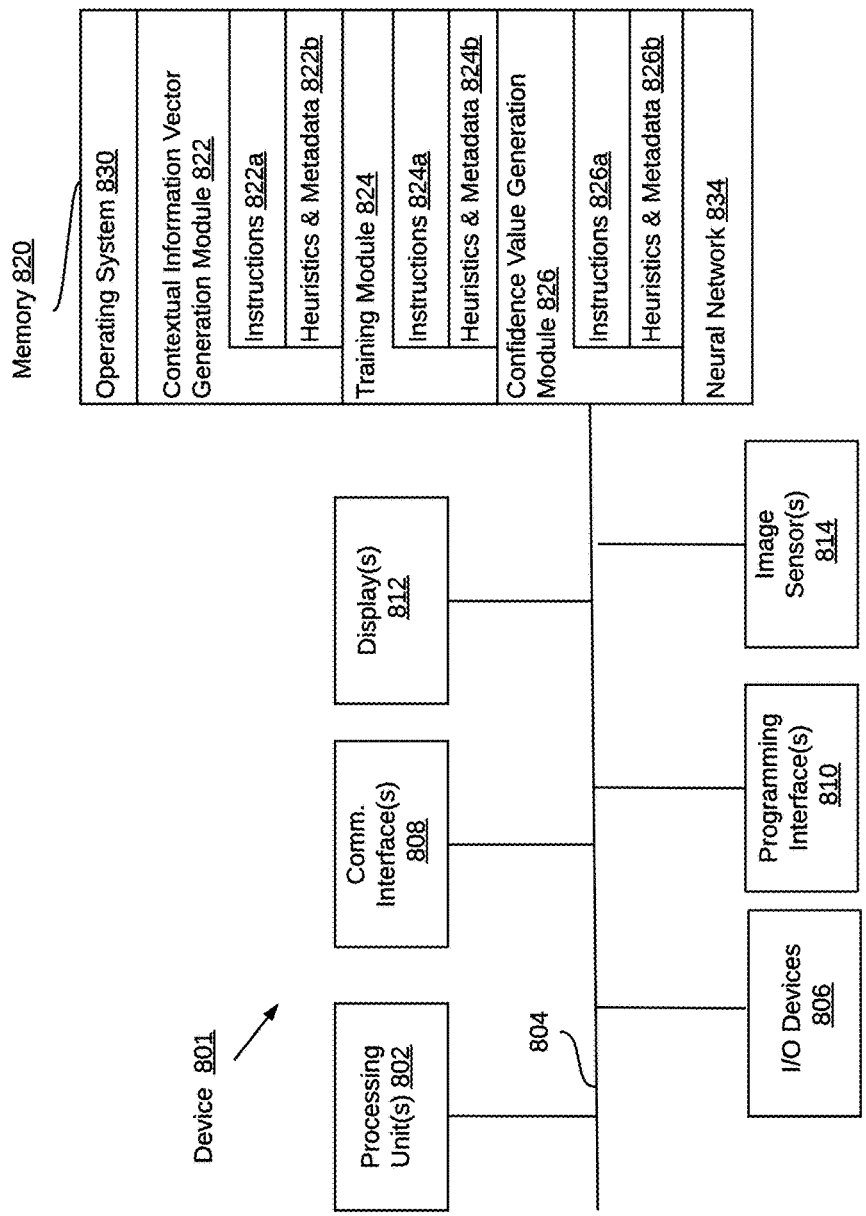
FIG. 8 is a block diagram of an example device in accordance with some implementations.

In some implementations, the image processing system 300 shown in FIG. 3, including the trained neural network 304 is implemented in a controller or a device (e.g., the device 801 shown in FIG. 8). As mentioned above, in some implantations, the controller or the device includes a suitable combination of software, firmware, and/or hardware. The device 801 is described in greater detail below with respect to FIG. 8.

In some implementations, the process 600 illustrates the trained neural network obtaining (610) an image data frame 601. The image data frame 601 corresponds to an unlabeled image data frame for an unknown scene and containing unknown objects that are not marked with any object instance representations or segmentation masks. Those of ordinary skill in the art will appreciate that the image data frame 601 may be obtained from myriad sources in various implementations. In one example, with reference to FIGS. 1 and 3, the image data frame 601 corresponds to a live image associated with the field of view of a camera (e.g., the image sensor 101 shown in FIGS. 1 and 3).

As a non-limiting example and for the sake of brevity, FIG. 6 shows a process 600 performed based on the image data frame 601. Those of ordinary skill in the art will appreciate from the present disclosure that this process (e.g., the process 600) can occur on a pixel-wise basis or a predefined pixel area basis (e.g., an M pixel by N pixel area).

In some implementations, the process 600 illustrates the image processing system or a component thereof (e.g., the feature extractor 113 shown in FIGS. 1 and 3) generating (620) feature maps 621 based on the image data frame 601. In some implementations, the image processing system generates the feature maps 621 by performing a feature extractor (e.g., the feature extractor of the neural network) on the unlabeled image data frame 601. Here, the unlabeled image data frame 601 contains two unknown objects (e.g., a first unknown object that corresponds to a sink and a second unknown object that corresponds to a bathtub).

In some implementations, the process 600 illustrates the image processing system or a component thereof (e.g., one of the auxiliary tasks 115, 117, and 119 shown in FIGS. 1 and 3) generating (630) a plurality of prediction values 631, 632, 633, and 634 that correspond to different scene types. For example, the prediction value 631 corresponds to a kitchen scene, the prediction value 632 corresponds to a bathroom scene, the prediction value 633 corresponds to an office scene, and the prediction value 634 corresponds to a living room scene. In some implementations, the prediction values have magnitudes that correspond to a prediction score or value for a respective scene. Here, the prediction value 632 corresponds to a positive value that indicates that the scene of the unlabeled image data frame 601 is most likely a bathroom. As shown in FIG. 6, the prediction values 631, 633, and 634 have magnitudes that correspond to negative values. The negative values indicate that the scene of the unlabeled image data frame 601 does not correspond to a kitchen scene, an office scene, or a living room scene. In this specific example, the magnitudes of the plurality of prediction values 631, 632, 633, and 634 indicate that it is very likely that the unlabeled image data frame 601 corresponds to a bathroom scene and not a kitchen scene, an office scene or a living room scene because the only value with a positive magnitude is the prediction value 632 that corresponds to a bathroom scene. As such, for example, the step 630 is performed by an auxiliary task associated with scene classification.

In some implementations, the process 600 illustrates the image processing system or a component thereof (e.g., one of the auxiliary tasks 115, 117, and 119 shown in FIGS. 1 and 3) generating (640) a plurality of contextual information values 641, 642, 643, and 644 that correspond to objects, features, and/or classes that are present within a particular scene. In some implementations, at least some of the plurality of contextual information values corresponds to an amalgamation of results from an individual object recognition task. In some implementations, each contextual information values 641, 642, 643, and 644 correspond to an individual result from object specific classifiers. In some implementations, at least some of the plurality of contextual information values corresponds to a binary value for the presence or absence of an object within the input image. For example, the image processing system may be trained to recognize that a bathroom scene is likely to include a toilet, a sink, a bathtub, a shower, or the like. As such, the step 640 is performed by a plurality of auxiliary tasks each associated with different object specific classifiers. Alternatively, the step 640 is performed by an auxiliary task associated a plurality of different object specific classifiers As shown in FIG. 6, in some implementations, the contextual information values 641, 642, 643, and 643 have magnitude values that correspond to a prediction score or probability of the presence of absence of an object within the unlabeled image data frame 601. As such, as illustrated in FIG. 6 at step 640, a contextual information value 641 may correspond to the probability of the pixel 603 corresponding to a toilet, a contextual information value 642 may correspond to the probability of the pixel 603 corresponding to a sink, a contextual information value 643 may correspond to the probability of the pixel 603 corresponding to bathtub, and a contextual information value 644 may correspond to the probability of the pixel 603 corresponding to a shower. In some implementations, the contextual information values 641, 643, 643, and 644 corresponds to gradient probability values between 0 and 1. In this specific example, the magnitudes of the contextual information value 642 and the contextual information values 643 represent gradient probability values close to 1 because a sink and a bathtub are present within the scene. Following on the specific example, the magnitudes of the contextual information vector represents gradient probability values close to 0 because a toilet and a shower are not present within the scene.

In some implementations, the process 600 illustrates the image processing system or a component thereof (e.g., the contextual information vector generation engine 121 shown in FIGS. 1 and 3) generating (650) a contextual information vector 651 based on the function of the set of prediction values 631, 632, 633, and 634 and/or the plurality of contextual information values 641, 642, 643, and 644. In some implementations, the process 600 illustrates the image processing system generating the contextual information vector 651 based on an aggregation of a portion of the function of the set of prediction values 631, 632, 633, and 634 and/or the plurality of contextual information values 641, 642, 643, and 644.

In some implementations, the process 600 illustrates the image processing system or a component thereof (e.g., the confidence value generation engine 127 shown in FIGS. 1 and 3) generating (660) a confidence value 661 based on the contextual information vector 651. In some implementations, the confidence value 661 is correlated with an understanding of the scene such as a certainty or uncertainty of the trained neural network 304.

Figure 7:
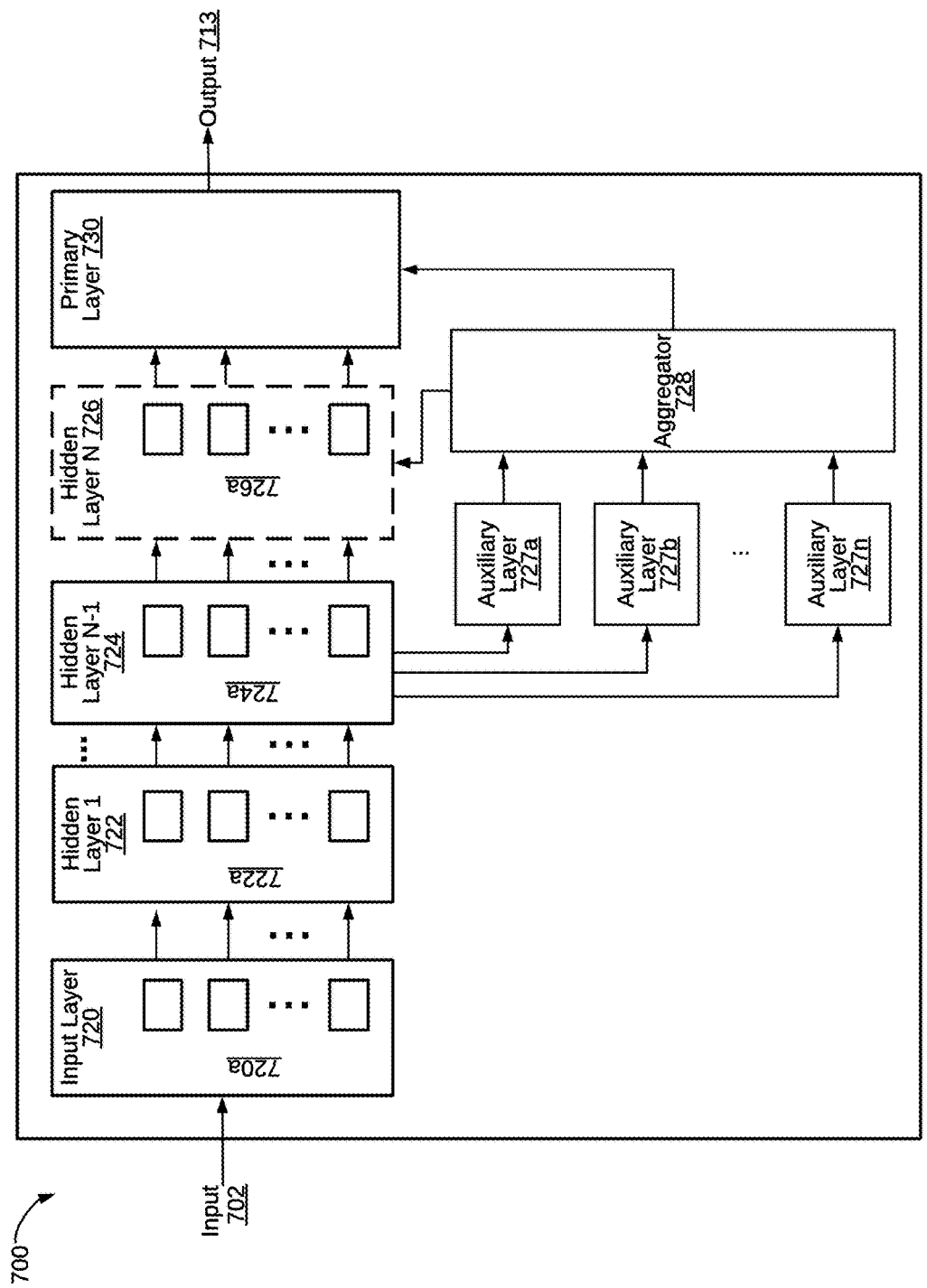
FIG. 7 is a block diagram of an example neural network in accordance with some implementations.

FIG. 7 is a block diagram of an example neural network 700 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 700 includes an input layer 720, a first hidden layer 722, a second hidden layer N-1 724, an optional N-th hidden layer 726, a primary layer 730 (e.g., the primary task 123 shown in FIGS. 1-3), auxiliary layers 727a, 727b, . . . , 727n (e.g., the auxiliary tasks 115, 117, and 119 shown in FIGS. 1-3), and an aggregator 728 (e.g., the contextual information vector generation engine 121 shown in FIGS. 1-3). While the neural network 700 (e.g., the neural network 131 shown in FIGS. 1 and 2, or the trained neural network 304 shown in FIG. 3) includes three hidden layers as an example, those of ordinary skill in the art will appreciate from the present disclosure that one or more additional hidden layers are also present in various implementations. Adding additional hidden layers adds to the computational complexity and memory demands but may improve performance for some applications. Furthermore, while the neural network 700 includes a single output layer as an example, those of ordinary skill in the art will appreciate from the present disclosure that one or more additional output layers are also present in various implementations.

In various implementations, the input layer 720 is coupled (e.g., configured) to receive an input 702 (e.g., one or more image data frames). For example, the input layer 720 receives pixel data from one or more image sensors. In various implementations, the input layer 720 includes a number of long short-term memory (LSTM) logic units 720a, which are also referred to as model(s) of neurons by those of ordinary skill in the art. In some such implementations, an input matrix from the features to the LSTM logic units 720a include rectangular matrices. For example, the size of this matrix is a function of the number of features included in the feature stream.

In some implementations, the first hidden layer 722 includes a number of LSTM logic units 722a. Those of ordinary skill in the art will appreciate that, in such implementations, the number of LSTM logic units per layer is orders of magnitude smaller than previously known approaches, which allows such implementations to be embedded in highly resource-constrained devices. As illustrated in the example of FIG. 7, the first hidden layer 722 receives its inputs from the input layer 720. For example, the first hidden layer 722 performs one or more of following: a convolutional operation, a nonlinearity operation, a normalization operation, a pooling operation, and/or the like.

In some implementations, the second hidden layer N-1 724 includes a number of LSTM logic units 724a. In some implementations, the number of LSTM logic units 724a is the same as or similar to the number of LSTM logic units 720a in the input layer 720 or the number of LSTM logic units 722a in the first hidden layer 722. As illustrated in the example of FIG. 7, the second hidden layer N-1 724 receives its inputs from the first hidden layer 722. Additionally and/or alternatively, in some implementations, the second hidden layer N-1 724 receives its inputs from the input layer 720. For example, the second hidden layer N-1 724 performs one or more of following: a convolutional operation, a nonlinearity operation, a normalization operation, a pooling operation, and/or the like.

In some implementations, the auxiliary layers 727a, 727b, . . . , 727n are task-dependent output layers that perform scene understanding operations, scene classification operations, object recognition operations, segmentation operations, or the like on results from the second hidden layer N-1 724 (e.g., feature maps). In some implementations, an aggregator 728 aggregates the results from the auxiliary layers 727a, 727b, . . . , 727n. As illustrated in the example of FIG. 7, the aggregator 728 provides an output to the optional N-th hidden layer 726 or the primary layer 730.

In some implementations, the optional N-th hidden layer 726 includes a number of LSTM logic units 726a. In some implementations, the number of LSTM logic units 726a is the same as or similar to the number of LSTM logic units 720a in the input layer 720, the number of LSTM logic units 722a in the first hidden layer 722, or the number of LSTM logic units 724a in the second hidden layer N-1 724. As illustrated in the example of FIG. 7, the optional N-th hidden layer 726 receives its inputs from the second hidden layer N-1 724 and the aggregator 728. Additionally and/or alternatively, in some implementations, the second hidden layer N-1 724 receives its inputs from the input layer 720. For example, the N-th optional hidden layer 726 performs one or more of following: a convolutional operation, a nonlinearity operation, a normalization operation, a pooling operation, and/or the like.

In some implementations, the primary layer 730 is a task-dependent output layer that performs a computer vision related task on the output of the optional N-th hidden layer 726 and/or the aggregator 728, such as instance segmentation, semantic segmentation, or the like. In some implementations, the primary layer 730 includes an implementation of a multinomial logistic function (e.g., a soft-max function) that produces a number of outputs 713.

Neural networks, such as CNNs, are often used to solve computer vision problems including feature extraction, object recognition, object detection, and pose estimation. A modern CNN is typically described as having an input layer, a number of hidden layers, and an output layer. In at least some scenarios, the input to the input layer of the CNN is an image data frame while the output layer is a task-dependent layer. The hidden layers often include one of a plurality of operations such as convolutional, nonlinearity, normalization, and pooling operations. For example, a respective convolutional layer may include a set of filters whose weights are learned directly from data. Continuing with this example, the output of these filters are one or more feature maps that are obtained by applying filters to the input data of the convolutional layer.

FIG. 8 is a block diagram of an example of a device 801 in accordance with some implementations. For example, the device 801 corresponds to at least one of a near-eye system, a mobile phone, a tablet, AR glasses, or the like. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 801 includes one or more processing units 802 (e.g., microprocessors, application specific integrated circuits (ASICs), field-programmable gate arrays (FPGAs), graphical processing units (GPUs), central processing units (CPUs), processing cores, and/or the like), one or more I/O devices and sensors 806, one or more communications interfaces 808 (e.g., Universal Serial Bus (USB), Institute of Electrical and Electronics Engineers (IEEE) 802.3x, IEEE 802.11x, IEEE 802.16x, Global System for Mobile communications (GSM), code-division multiple access (CDMA), time-division multiple access (TDMA), Global Positioning System (GPS), infrared (IR), BLUETOOTH, ZIGBEE, and/or the like type interfaces), one or more programming (e.g., I/O) interfaces 810, one or more displays 812, one or more image sensors 814 (e.g., the image sensor 101 shown in FIGS. 1 and 3), a memory 820, and one or more communication buses 804 for interconnecting these and various other components.

In some implementations, the one or more communication buses 804 include circuitry that interconnects and controls communications between system components. In some implementations, the one or more I/O devices and sensors 806 includes at least one of a keyboard, a mouse, a touchpad, a joystick, one or more microphones, one or more speakers, one or more image sensors, one or more displays, and/or the like.

In some implementations, the one or more displays 812 are capable of presenting a video content to a user. In some implementations, the one or more displays 812 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 812 correspond to diffractive, reflective, polarized, holographic, etc. waveguide displays.

In some implementations, the one or more image sensors 814 are configured to obtain image data frames. For example, the one or more image sensors 814 correspond to one or more RGB cameras (e.g., with a complementary metal-oxide-semiconductor (CMOS) image sensor, or a charge-coupled device (CCD) image sensor), IR image sensors, event-based cameras, and/or the like.

The memory 820 includes high-speed random-access memory, such as DRAM, SRAM, DDR RAM, or other random-access solid-state memory devices. In some implementations, the memory 820 includes non-volatile memory, such as one or more magnetic disk storage devices, optical disk storage devices, flash memory devices, or other non-volatile solid-state storage devices. The memory 820 optionally includes one or more storage devices remotely located from the one or more processing units 802. The memory 820 comprises a non-transitory computer readable storage medium. In some implementations, the memory 820 or the non-transitory computer readable storage medium of the memory 820 stores the following programs, modules and data structures, or a subset thereof including an optional operating system 830, a contextual information vector generation module 822, a training module 824, a confidence value generation module 826, and a neural network 834. In some implementations, one or more instructions are included in a combination of logic and non-transitory memory.

The operating system 830 includes procedures for handling various basic system services and for performing hardware dependent tasks.

In some implementations, the contextual information vector generation module 822 is configured to generate a contextual information vector (e.g., the contextual information vector 651 shown in FIG. 6) associated with an image data frame based on the results of auxiliary tasks (e.g., the auxiliary tasks 115, 117, and 119 shown in FIGS. 1-3). To that end, in various implementations, the contextual information vector generation module 822 includes instructions 822a and/or logic therefor, and heuristics and metadata 822b therefor.

In some implementations, the training module 824 is configured to train the neural network 834 (e.g., the neural network 131 shown in FIG. 2) and the contextual information vector generation module 822 (e.g., the contextual information vector generation engine 121 shown in FIG. 2). In some implementations, the training module 824 includes a training corpus (e.g., the training data set 105 shown in FIGS. 1 and 2). To that end, in various implementations, the training module 824 includes instructions 824a and/or logic therefor, and heuristics and metadata 824b therefor.

In some implementations, the confidence value generation module 826 is configured to generate a confidence value (e.g., the confidence value 661 shown in FIG. 6) or probability correlated based on the contextual information vector. To that end, in various implementations, the confidence value generation module 826 includes instructions 826a and/or logic therefor, and heuristics and metadata 826b therefor.

In some implementations, the neural network 834 includes a feature extractor (e.g., the feature extractor 113 shown in FIGS. 1-3), an auxiliary task sub-network (e.g., the auxiliary tasks 115, 117, and 119 shown in FIGS. 1-3), and a primary task sub-network (e.g., the primary task 123 shown in FIGS. 1-3). For example, the neural network 834 corresponds to the neural network 700 in FIG. 7.

Although the contextual information vector generation module 822, the training module 824, the confidence value generation module 826, and the neural network 834 are shown as residing on a single device, it should be understood that in some implementations, any combination of the contextual information vector generation module 822, the training module 824, the confidence value generation module 826, and the neural network 834 may be located in separate computing devices.

Moreover, FIG. 8 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 8 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first auxiliary task could be termed a second auxiliary task, and, similarly, a second auxiliary task could be termed a first auxiliary task, which changing the meaning of the description, so long as the occurrences of the "first auxiliary task" are renamed consistently and the occurrences of the "second auxiliary task" are renamed consistently. The first auxiliary task and the second auxiliary task are both auxiliary tasks, but they are not the same auxiliary task.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an image processing system including: a confidence value generation engine, and a neural network having at least a feature extractor, an auxiliary task sub-network, a primary task sub-network, and a contextual information vector generation engine:
     obtaining, by the feature extractor of the neural network, a set of feature maps for an image data frame by processing the image data frame with the feature extractor of the neural network;
     performing, by the primary task sub-network of the neural network, a primary task on the set of feature maps for the image data frame in order to generate a primary task result;
     performing, by the auxiliary task sub-network of the neural network, one or more auxiliary tasks on the set of feature maps in order to generate one or more auxiliary task results, wherein the one or more auxiliary tasks are different from the primary task;
     generating, by the contextual information vector generation engine, a contextual information vector associated with the image data frame based on the one or more auxiliary task results from one or more auxiliary tasks performed on the set of feature maps by the auxiliary task sub-network of the neural network; and
     generating, by the confidence value generation engine, a confidence value based at least in part on the contextual information vector, wherein the confidence value corresponds to a reliability metric for the primary task result.

2. The method of claim 1 further comprising, providing the primary task result to one or more subsequent operations in response to determining that the confidence value breaches a reliability threshold.

3. The method of claim 1 further comprising, generating an error alert associated with the primary task result in response to determining that the confidence value does not breach a reliability threshold.

4. The method of claim 1 further comprising, discarding the primary task result in response to determining that the confidence value does not breach a reliability threshold.

5. The method of claim 1, further comprising:
   determining whether or not the confidence value breaches a reliability threshold;
   in response to determining that the confidence value breaches the reliability threshold, performing plane expansion on the image data frame based on the primary task result; and
   in response to determining that the confidence value does not breach the reliability threshold:
     discarding the primary task result and
     performing a geometric plane estimation operation on the image data frame.

6. The method of claim 1, further comprising:
   providing the contextual information vector to the primary task sub-network of the neural network, and
   wherein performing, by the primary task sub-network of the neural network, the primary task includes performing the primary task on the set of feature maps for image data frame and the contextual information vector in order to generate a result.

7. The method of claim 1, wherein the feature extractor of the neural network corresponds to hidden layers of the neural network, wherein the auxiliary task sub-network of the neural network corresponds to one or more parallel output layers of the neural network that perform auxiliary tasks, and wherein the primary task sub-network of the neural network corresponds to an output layer of the neural network that performs the primary task.

8. The method of claim 1 further comprising, obtaining the image data frame.

9. The method of claim 8, wherein obtaining the image data frame includes capturing the image data frame using an image sensor of the device.

10. The method of claim 1, wherein the image data frame corresponds to a single image data frame.

11. The method of claim 1, wherein the image data frame corresponds to a set of one or more image data frames.

12. The method of claim 1, wherein the confidence value corresponds to a probability or a score.

13. The method of claim 1, wherein the primary task corresponds to at least one of an instance segmentation task or a semantic segmentation task.

14. The method of claim 1, wherein a respective auxiliary task among the one or more auxiliary tasks corresponds to at least one of a scene classification task, a scene understanding task, a segmentation task, or an object recognition task.

15. The method of claim 1, wherein the neural network corresponds to a convolutional neural network (CNN).

16. An image processing system comprising a confidence value generation engine, and a neural network having at least a feature extractor, an auxiliary task sub-network, a primary task sub-network, and a contextual information vector generation engine, the image processing system further comprising:
one or more processors;
a non-transitory memory; and
one or more programs stored in the non-transitory memory, which, when executed by the one or more processors, cause the device to:
obtain, by the feature extractor of the neural network, a set of feature maps for an image data frame by processing the image data frame with the feature extractor of the neural network;
perform, by the primary task sub-network of the neural network, a primary task on the set of feature maps for the image data frame in order to generate a primary task result;
perform, by the auxiliary task sub-network of the neural network, one or more auxiliary tasks on the set of feature maps in order to generate one or more auxiliary task results, wherein the one or more auxiliary tasks are different from the primary task;
generate, by the contextual information vector generation engine, a contextual information vector associated with the image data frame based on the one or more auxiliary task results from one or more auxiliary tasks performed on the set of feature maps by the auxiliary task sub-network of the neural network; and
generate, by the confidence value generation engine, a confidence value based at least in part on the contextual information vector, wherein the confidence value corresponds to a reliability metric for the primary task result.

17. The image processing system of claim 16, wherein the one or more programs further cause the image processing system to:
provide the primary task result to one or more subsequent operations in response to determining that the confidence value breaches a reliability threshold.

18. The image processing system of claim 16, wherein the one or more programs further cause the image processing system to:
generate an error alert associated with the primary task result in response to determining that the confidence value does not breach a reliability threshold.

19. The image processing system of claim 16, wherein the one or more programs further cause the image processing system to:
discard the primary task result in response to determining that the confidence value does not breach a reliability threshold.

20. A non-transitory memory storing one or more programs, which, when executed by one or more processors of an image processing system comprising a confidence value generation engine, and a neural network having at least a feature extractor, an auxiliary task sub-network, a primary task sub-network, and a contextual information vector generation engine, cause the image processing system to:
obtain, by the feature extractor of the neural network, a set of feature maps for an image data frame by processing the image data frame with the feature extractor of the neural network;
perform, by the primary task sub-network of the neural network, a primary task on the set of feature maps for the image data frame in order to generate a primary task result;
perform, by the auxiliary task sub-network of the neural network, one or more auxiliary tasks on the set of feature maps in order to generate one or more auxiliary task results, wherein the one or more auxiliary tasks are different from the primary task;
generate, by the contextual information vector generation engine, a contextual information vector associated with the image data frame based on the one or more auxiliary task results from one or more auxiliary tasks performed on the set of feature maps by the auxiliary task sub-network of the neural network; and
generate, by the confidence value generation engine, a confidence value based at least in part on the contextual information vector, wherein the confidence value corresponds to a reliability metric for the primary task result.

21. The non-transitory memory of claim 20, wherein the one or more programs further cause the image processing system to:
provide the primary task result to one or more subsequent operations in response to determining that the confidence value breaches a reliability threshold.

22. The non-transitory memory of claim 20, wherein the one or more programs further cause the image processing system to:
generate an error alert associated with the primary task result in response to determining that the confidence value does not breach a reliability threshold.

23. The non-transitory memory of claim 20, wherein the one or more programs further cause the image processing system to:
discard the primary task result in response to determining that the confidence value does not breach a reliability threshold.

* * * * *